(12) United States Patent
Wang et al.

(10) Patent No.: US 9,246,199 B2
(45) Date of Patent: Jan. 26, 2016

(54) BATTERY PACK

(71) Applicant: Samsung SDI Co., Ltd., Yongin, Gyeonggi-do (KR)

(72) Inventors: Han-Jun Wang, Yongin (KR); Dae-Yon Moon, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 205 days.

(21) Appl. No.: 13/801,305

(22) Filed: Mar. 13, 2013

(65) Prior Publication Data

US 2014/0147705 A1    May 29, 2014

(30) Foreign Application Priority Data

Nov. 27, 2012 (KR) .................. 10-2012-0135557

(51) Int. Cl.
   *H01M 10/48* (2006.01)
   *H01M 2/10* (2006.01)
   *H01M 2/20* (2006.01)
   *H01M 10/44* (2006.01)

(52) U.S. Cl.
   CPC .......... *H01M 10/482* (2013.01); *H01M 2/1061* (2013.01); *H01M 2/202* (2013.01); *H01M 10/443* (2013.01); *H01M 10/486* (2013.01)

(58) Field of Classification Search
   CPC ..................................................... H01M 10/48
   USPC ........................................ 429/92, 158–161, 7
   See application file for complete search history.

(56) References Cited

U.S. PATENT DOCUMENTS

| 2002/0022178 | A1 | 2/2002 | Asaka et al. |
| 2005/0140338 | A1* | 6/2005 | Kim et al. ..................... 320/150 |
| 2005/0174092 | A1 | 8/2005 | Dougherty et al. |
| 2009/0297892 | A1* | 12/2009 | Ijaz et al. .......................... 429/7 |
| 2010/0073005 | A1 | 3/2010 | Yano et al. |
| 2010/0285340 | A1* | 11/2010 | Matsunaga .................... 429/90 |

(Continued)

FOREIGN PATENT DOCUMENTS

| JP | 2002-008627 A | 1/2002 |
| JP | 2007-012487 A | 1/2007 |

(Continued)

OTHER PUBLICATIONS

Office Action dated Oct. 31, 2013 for corresponding KR Application No. 10-2012-0135557.

(Continued)

*Primary Examiner* — Kenneth Douyette
*Assistant Examiner* — James Lee
(74) *Attorney, Agent, or Firm* — Knobbe Martens Olson & Bear LLP

(57) ABSTRACT

The present invention relates to a battery pack. The battery pack includes a plurality of battery cells arranged side-by-side, a lead plate electrically connecting the plurality of battery cells, a protection circuit module electrically connected with the plurality of battery cells, and a temperature sensor electrically connected with the protection circuit module to measure a temperature of the plurality of battery cells, wherein the lead plate has hole into which the temperature sensor is inserted, for fixing the position of the temperature sensor. By the above construction, the installation position of the temperature sensor is specified, so that the temperature sensor may be prevented from being damaged and the reliability of the temperature sensor may be enhanced.

16 Claims, 3 Drawing Sheets

(56) References Cited

U.S. PATENT DOCUMENTS

| | | |
|---|---|---|
| 2010/0309949 A1 | 12/2010 | Akaboshi et al. |
| 2012/0148876 A1 | 6/2012 | Zeng et al. |
| 2012/0189900 A1 | 7/2012 | Park et al. |

FOREIGN PATENT DOCUMENTS

| | | |
|---|---|---|
| JP | 2009-277420 A | 11/2009 |
| JP | 2010-281593 | 12/2010 |
| KR | 2010-0130943 A | 12/2010 |
| KR | 2012-0085487 A | 8/2012 |

OTHER PUBLICATIONS

Extended European Search Report issued on Mar. 21, 2014 for European Application No. 13164269.6.

* cited by examiner

BATTERY PACK

CROSS-REFERENCE TO RELATED APPLICATIONS

This application claims the benefit of Korean Patent Application No. 10-2012-0135557, filed on Nov. 27, 2012, in the Korean Intellectual Property Office, the disclosure of which is incorporated herein in its entirety by reference.

BACKGROUND OF THE INVENTION

1. Field of the Invention

The present invention relates to a battery pack.

2. Description of the Related Art

With the development of wireless internet or communication technologies, portable computers, such as tablet PCs or notebook computers, which are operated by using batteries instead of a power supply, have quickly come into widespread use. Generally, since portable computers are compact enough to carry easily, the portable computers are being widely used for business or personal use. In order to use such a portable computer in various places regardless of a power supply, the portable computer may be provided with a built-in battery pack. The battery pack may be provided with a plurality of rechargeable batteries which are repeatedly chargeable and dischargeable.

For long time use, the battery pack may include a system for monitoring temperature information of a battery cell and detecting an emergency event, such as overheating, in advance to prevent an accident such as an explosion.

SUMMARY OF THE INVENTION

The present invention provides a battery pack that may prevent a temperature sensor monitoring temperature information of a battery cell from being damaged and enhance the reliability of the temperature sensor.

According to an aspect of the present invention, there is provided a battery pack including: a plurality of battery cells arranged side-by-side, a lead plate electrically connecting the plurality of battery cells, a protection circuit module electrically connected with the lead plate, and a temperature sensor electrically connected with the protection circuit module to measure the temperature of the plurality of battery cells, wherein the lead plate has a hole into which the temperature sensor is inserted, for fixing the position of the temperature sensor.

The hole may be formed in an area having a step.

The temperature sensor may be connected with the protection circuit module through a flexible cable.

The lead plate may include a plurality of conductive plates electrically connecting the neighboring two of the plurality of battery cells, and an insulation film enclosing the plurality of conductive plates.

The conductive plate may include a welding portion exposed from the insulation film to be electrically connected with an electrode terminal of the battery cell, the welding portion may include one pair of welding terminals spaced apart from each other, and the conductive plate may include a bypass portion which bypasses the welding terminals in one pair and electrically connects the welding terminals in one pair.

The bypass portion may include one end contacting one of the welding terminals in one pair, and the other end contacting the other of the welding terminals in one pair, and an interval between the one end and the other end is larger than that between the welding terminals in one pair.

The bypass portion may be folded on the welding terminals in one pair.

The battery pack may further include a lead tab between the electrode terminal and the welding portion.

The lead tab may include a temperature protection device.

The lead plate is positioned on the same one side surface of the plurality of battery cells.

According to another aspect of the present invention, there is provided a battery pack including a plurality of battery cells arranged side-by-side, a lead plate electrically connecting the plurality of battery cells, a protection circuit module electrically connected with the lead plate, and a temperature sensor electrically connected with the protection circuit module, wherein the lead plate has a hole exposing at least one surface of the plurality of battery cells, and the temperature sensor contacts the surface exposed through the hole to measure the temperature of the plurality of battery cells.

The lead plate is positioned on the same one side surface of the plurality of battery cells.

The temperature sensor may be inserted into the hole.

The hole may be formed in an area having a step.

The lead plate may include a plurality of conductive plates electrically connecting the neighboring two of the plurality of battery cells, and an insulation film enclosing and connecting the plurality of conductive plates.

The conductive plate may include a welding portion exposed from the insulation film to be electrically connected with an electrode terminal of the battery cell, the welding portion may include one pair of welding terminals spaced apart from each other, and the conductive plate may include a bypass portion which bypasses the welding terminals in one pair and electrically connects the welding terminals in one pair.

The bypass portion may include one end contacting one of the welding terminals in one pair, and the other end contacting the other of the welding terminals in one pair, and an interval between the one end and the other end is larger than that between the welding terminals in one pair.

The bypass portion may be folded on the welding terminals in one pair.

The battery pack may further include a lead tab between the electrode terminal and the welding portion.

The lead tab may include a temperature protection device, and the electrode terminal is a negative electrode terminal.

The protection circuit module may control charge and discharge of the plurality of battery cells according to the temperature measured by the temperature sensor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENT

The present invention will be apparent from the detailed description of embodiments taken in conjunction with the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Further, the present invention is only defined by scopes of claims. In the following description, the technical terms are used only for explaining a specific exemplary embodiment while not limiting the present invention. The terms of a singular form may include plural forms unless otherwise specified. Also, the meaning of "include," "comprise," "including," or "comprising," specifies a property, a region, a fixed number, a step, a process, an element and/or a component but does not exclude other properties, regions, fixed numbers, steps, processes, elements and/or components. Relational terms such as 'first', 'second', and the like may be used for describing various elements, but the elements should not be limited by the terms. These terms are only used to distinguish one element from another.

Figure 1:
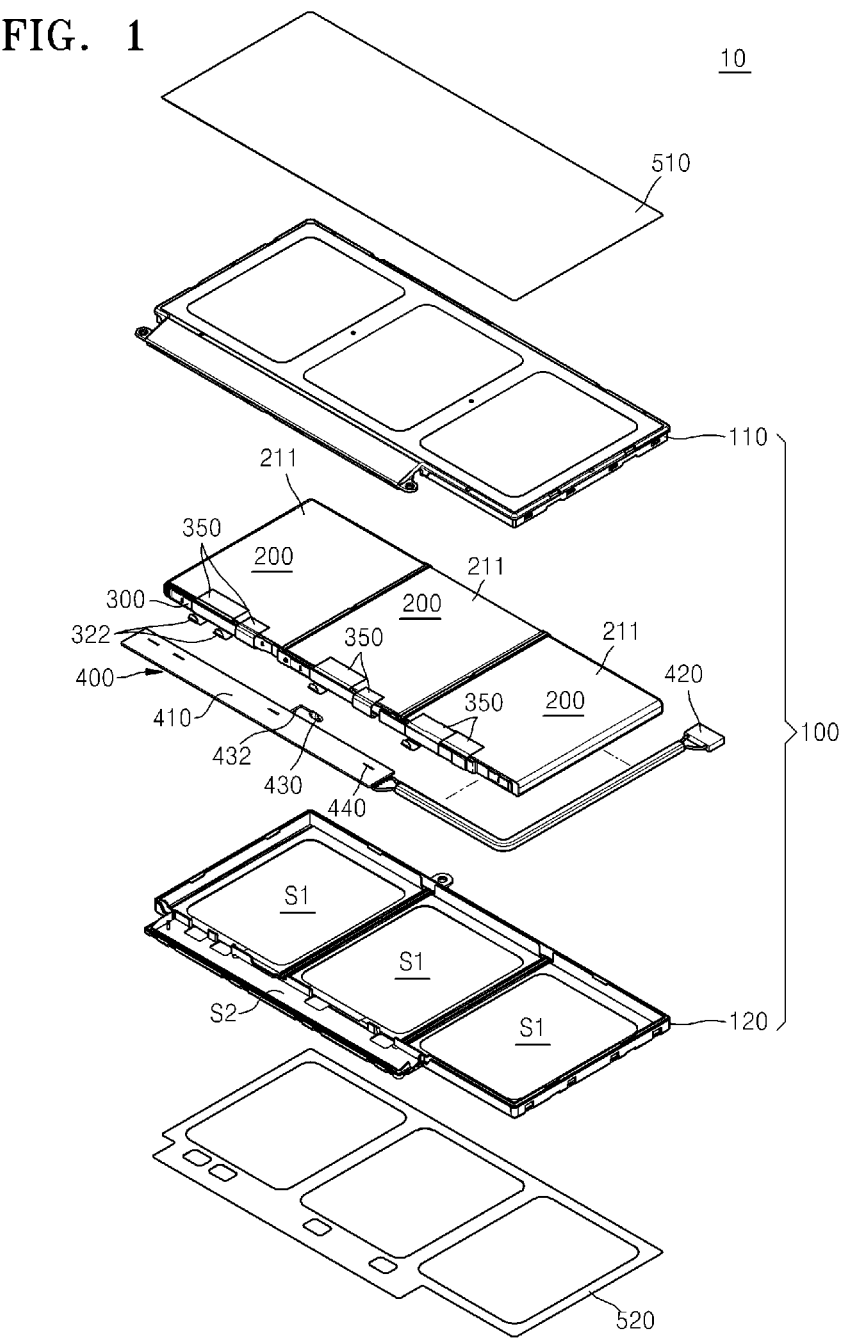
FIG. 1 is an exploded perspective view schematically illustrating a battery pack according to an embodiment of the present invention.

FIG. 1 is an exploded perspective view schematically illustrating a battery pack according to an embodiment of the present invention.

Referring to FIG. 1, a battery pack 10, according to an embodiment of the present invention, includes a plurality of battery cells 200, a lead plate 300 electrically connecting the plurality of battery cells 200, and a protection circuit module 400 electrically connected with the lead plate 300, and a temperature sensor 430 electrically connected to the protection circuit module 400. The plurality of battery cells 200, the lead plate 300 and the protection circuit module 400 are received in a case 100.

First, the case 100 may include an upper case 110 and a lower case 120 coupled to each other. The upper case 110 and the lower case 120 may be coupled to each other through a hook structure formed along a side surface. Also, the lower case 120 may be provided with a space S1 where the battery cells 200 may be mounted, and a space S2 where the protection circuit module 400 may be mounted.

Meanwhile, the exterior material of the battery cell 200 received in the case 100 may be a can 211 including a metal material, and the case 100 may be formed of an insulation material so as to avoid unnecessary electrical contact of the battery cells 200. For example, the case 100 may be a plastic case formed by an injection molding.

Also, in order to minimize the overall thickness of the case 100, an upper surface of the upper case 110 or a lower surface of the lower case 120 may be formed in a state that an area corresponding to an upper surface or a lower surface of the battery cell 200 is opened. The opened areas of the upper case 110 and the lower case 120 may be covered by labels 510 and 520 attached to the upper case 110 and the lower case 120, respectively.

The plurality of battery cells 200 may be a rechargeable battery, for example, a lithium-ion battery. Each of the battery cells 200 includes an electrode assembly (not shown) and the can 211 receiving the electrode assembly.

The electrode assembly may be manufactured, for example, by stacking a positive plate, a negative plate, and a separator interposed therebetween, and then winding the stacked body in a jelly-roll shape. The can 211 may be formed of, but not limited to, aluminum or an aluminum alloy.

The plurality of battery cells 200 may be arranged side-by-side along one direction. While FIG. 1 illustrates that the battery pack 10 includes three battery cells 200, the present invention is not limited thereto.

The plurality of battery cells 200 may be electrically connected to one another in series, in parallel, or in series and parallel. The lead plate 300 may be stably coupled to the battery cells 200 by a tape 350, and may have a hole (see 330 of FIG. 2) for fixing the position of the temperature sensor 430 measuring the temperature of the battery cell 200 and transmitting the temperature measurement results to the protection circuit module 400. The lead plate 300 will be described later with reference to FIGS. 2 through 5.

The protection circuit module 400 may include a substrate 410 and a protection device (not shown) built in one side of the substrate 410 or inside the substrate 410. The protection device may include a safety device comprised of a passive device such as a resistor and a condenser, or an active device such as a field effect transistor, or integrated circuits, which may be selectively formed.

The protection circuit module 400 may be electrically connected with the lead plate 300. For example, as a plurality of connection protrusions 322 are inserted into a plurality of connection grooves 440 formed in the protection circuit module 400, the protection circuit module 400 may be electrically connected with the lead plate 300. A connector 420 for supplying power to an external device may be provided at one side of the protection circuit module 400.

Meanwhile, the protection circuit module 400 may prevent overheating and explosion that may be generated due to overcharging, overdischarging, or overcurrent of the battery cells 200. For this, the temperature sensor 430 measuring the temperature of the plurality of battery cells 200 may be electrically connected to the protection circuit module 400.

The temperature sensor 430 generates temperature information measured at a position as an electrical signal and transmits the generated temperature information to the protection circuit module 400. The temperature sensor 430 may be, for example, a thermistor. More specifically, the thermistor may be a resistor type thermistor which generates an electrical signal corresponding to the temperature of an object to be measured, and has a resistance variable with temperature.

The temperature sensor 430 may monitor a temperature change of the battery cell 200 and the protection circuit module 400 may control charge and discharge of the battery cell 200 according to the monitored results. For this, an electrical signal generated from the temperature sensor 430 may be transmitted to the protection circuit module 400 through a cable 432 connecting the temperature sensor 430 and the protection circuit module 400.

Meanwhile, the temperature sensor 430 may be inserted into the hole (see 330 of FIG. 2) formed in the lead plate 300 and be fixed in position. Thus, as the installation position of the temperature sensor 430 is specified, damage of the temperature sensor 430 may be prevented or inhibited and the stability of the temperature sensor 430 may be enhanced.

Figure 2:
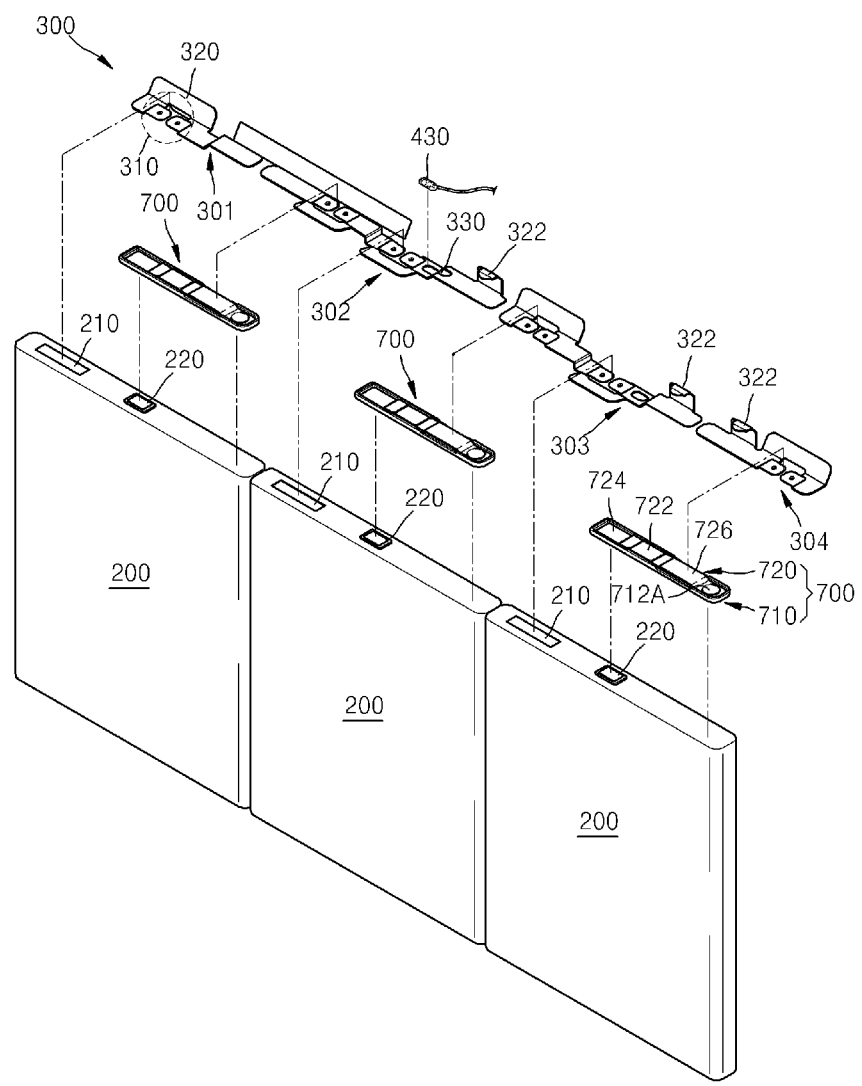
FIG. 2 is an exploded perspective view schematically illustrating some devices of the battery pack of FIG. 1.
Figure 3:
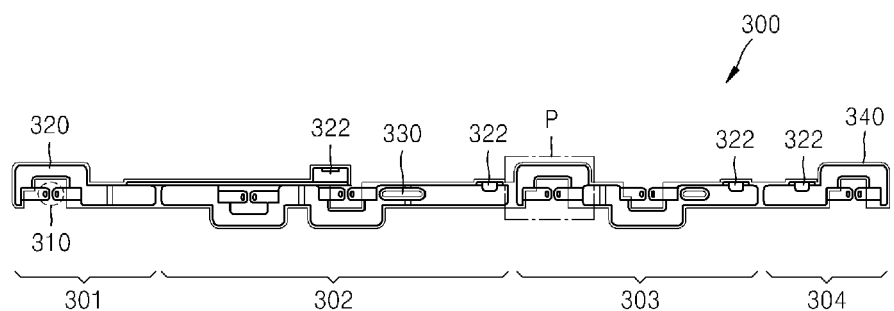
FIG. 3 is a plan view schematically illustrating a lead plate of the battery pack of FIG. 1.
Figure 4:
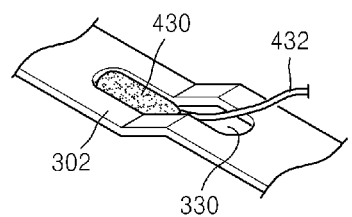
FIG. 4 is a partial perspective view illustrating a state that a temperature sensor is inserted into a hole of a lead plate in the battery pack of FIG. 1.
Figure 5:
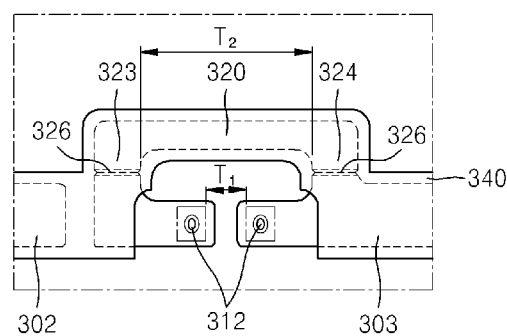
FIG. 5 is a detailed view of portion P of FIG. 3.

FIG. 2 is an exploded perspective view schematically illustrating some elements of the battery pack of FIG. 1; FIG. 3 is a plan view schematically illustrating a lead plate of the battery pack of FIG. 1; FIG. 4 is a partial perspective view illustrating a state that a temperature sensor is inserted into a hole of a lead plate in the battery pack of FIG. 1; and FIG. 5 is a detailed view of portion P of FIG. 3.

A first electrode terminal 210 and a second electrode terminal 220 are formed in one side surface of each of the plurality of battery cells 200. For example, the first electrode terminal 210 may be a positive electrode terminal and the second electrode terminal 220 may be a negative electrode terminal.

The lead plate 300 is positioned on the same one side surfaces of the plurality of battery cells 200 to electrically connect the plurality of battery cells 200 to one another. While FIG. 2 illustrates that three battery cells 200 are connected in series, the present invention is not limited thereto. That is, the number or the connection method of the battery cells 200 electrically connected to one another may be configured variously.

Referring to FIGS. 2 and 3, the lead plate 300 may include a plurality of conductive plates 301 to 304 electrically connecting, among the plurality of battery cells 200, the neighboring two battery cells 200, and an insulation film 340 enclosing and connecting the plurality of conductive plates 301 to 304.

More specifically, the lead plate 300 may include a first conductive plate 301, a second conductive plate 302, a third conductive plate 303, and a fourth conductive plate 304. Among those lead plates, the second conductive plate 302 and the third conductive plate 303 directly electrically connect the neighboring two battery cells 200, and the first conductive plate 301 and the fourth conductive plate 304 are electrically connected through an external circuit (not shown). That is, the first conductive plate 301 and the fourth conductive plate 304 function as terminals.

Since the insulation film 340 encloses and connects the separated plurality of conductive plates 301 to 304, the insulation film 340 prevents or inhibits a short-circuit between the plurality of conductive plates 301 to 304, and since the insulation film 340 allows the separated plurality of conductive plates 301 to 304 to be aligned at one time, the insulation film 340 may simplify the manufacture of the battery pack (10 of FIG. 1).

Further, each of the plurality of conductive plates 301 to 304 includes a welding portion 310 exposed from the insulation film 340. The welding portion 310 is welded with the first electrode terminal 210 or the second electrode terminal 220 of the battery cell 200.

For example, the welding portion 310 may be welded with the first electrode terminal 210 of the battery cell 200 and thus electrically connected with the battery cell 200.

The welding portion 310 includes one pair of welding terminals 312 spaced apart from each other, and the plurality of conductive terminals 301 to 304 may include a bypass portion 320 which bypasses and electrically connects the welding terminals 312 in one pair.

Referring to FIG. 5 more specifically illustrating the bypass portion 320, the bypass portion 320 includes one end contacting any one of the welding terminals 312 in one pair, and the other end 324 contacting the other of the welding terminals 312 in one pair. At this time, an interval T2 between the one end 323 and the other end 324 may be greater than an interval T1 between the welding terminals 312 in one pair.

The bypass portion 320 formed thus may decrease a leakage current that may be generated when an electrical resistance welding is performed using the welding terminals 312 in one pair. More specifically, when a current is applied between the welding terminals 312 in one pair in order to perform an electrical resistance welding, some of the applied current does not flow along the first electrode terminal 210 but becomes a leakage current bypassing the bypass portion 320. At this time, if the interval T2 between the one end 323 and the other end 324 of the bypass portion 320 is formed greater than the interval T1 between the welding terminals 312 in one pair, the path of the leakage current increases to increase the resistance, so that the leakage current passing through the one end 323 and the other end 324 of the bypass portion 320 decreases. As a result, weldability may be enhanced to effectively prevent or inhibit burst or soot due to leakage current.

Further, after the welding is completed, the bypass portion 320 is folded on the welding terminals 312 in one pair. To facilitate the folding of the welding terminals 312, a folding groove 326 may be formed in each of the one end 323 and the other end 324 of the bypass portion 320. As the bypass portion 320 is thus folded on the welding terminals 312 in one pair, the lead plate 300 may be easily positioned on the same one side surface of the plurality of battery cells 200 so that an increase in size of the battery pack (see 10 of FIG. 1) may be avoided.

Meanwhile, the bypass portion 320 may have a hole 330 into which the temperature sensor 430 is inserted and positioned.

The hole 330 exposes the one side surface of the battery cell 200 where the bypass portion 320 is positioned, and the temperature sensor 430 may contact the exposed one side surface of the battery cell 200 through the hole 330 to measure the temperature of the battery cell 200.

Therefore, the temperature of the battery cell 200 may be directly reflected into the temperature sensor 430. Meanwhile, since the temperature sensor 430 is connected with the protection circuit module (see 400 of FIG. 1) by a cable 432 that is ductile, an emergency event that the temperature of the battery pack is elevated up to an abnormally high temperature may be detected within a short time period in advance to prevent or inhibit an accident such as ignition or explosion.

Meanwhile, the hole 330 may be formed in an area having a step. As illustrated in FIG. 4, when the hole 330 is formed in the area having a step, the temperature sensor 430 may be easily aligned and may be prevented from protruding above the height of the lead plate 300 to thus allow the battery pack (see 10 of FIG. 1) to be more compact.

Thus, when the temperature sensor 430 is inserted in the hole 330 formed in the lead plate 300, the temperature sensor may be prevented or inhibited from being damaged and an immediate response to the temperature change of the battery cell 200 may be possible, so that the reliability of the temperature sensor 430 may be enhanced.

Also, the hole 330 may be formed in plurality if required, and the temperature sensor 430 may be positioned at each of the plurality of holes.

Again referring to FIG. 2, the battery pack (see 10 of FIG. 1) may further include a lead tab 700 between the first electrode terminal 210 or the second electrode terminal 220 of the battery cell and the welding portion 310.

For example, the lead tab 700 may be positioned between the negative electrode terminal, i.e., the second electrode terminal 220 and the welding portion 310. The present embodiment, however, is not limited thereto. The lead tab 700 may be disposed only at the positive electrode terminal, or at both of the positive electrode terminal and the negative electrode terminal.

The lead tab 700 may include an insulation cover 710 and a temperature protection device assembly 720. The insulation cover 710 supports the temperature protection device assembly 720, and is formed of an electrical insulation material, for example, a synthetic resin, such as polycarbonate or the like. The temperature protection device assembly 720 may include a temperature protection device 722, a first lead 724, and a second lead 726, and may be coupled with the insulation cover 710 by a boss 712A.

The temperature protection device 722 is a reversible device which allows a current to pass or blocks a current through itself according to temperature, and may prevent ignition or explosion of the battery cell 200 due to an overcurrent. While the temperature protection device 722 may be, for example, a polymer PTC in which conductive particles, such as metal particles or carbon particles are dispersed in a crystalline polymer, the present invention is not limited thereto.

The first lead 724 electrically connects the temperature protection device 722 and the negative electrode terminal 220 of the battery cell 200. The first lead 724 is exposed at a bottom surface of the insulation cover 710 so as to be connected with the negative electrode terminal 220.

The second lead 726 electrically connects the temperature protection device 722 and the lead plate 300. More specifically, the second lead 726 may be connected with the welding portion 310 by welding. That is, the negative electrode terminal 220 of the battery cell 200 is electrically connected to the lead plate 300 via the first lead 724, the temperature protection device 722 and the second lead 726 of the temperature protection device assembly 720. Therefore, when the battery cell 200 is heated above a predetermined temperature, the temperature protection device 722 blocks a current so that an additional overheating of the battery cell 200 may be immediately, effectively blocked.

According to an embodiment of the present invention, since the installation position of the temperature sensor is specified, damage of the temperature sensor may be prevented or inhibited, and the reliability of the temperature sensor may be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack comprising:
 a plurality of battery cells arranged side-by-side;
 a lead plate electrically connecting the plurality of battery cells;
 a protection circuit module electrically connected with the lead plate; and
 a temperature sensor electrically connected with the protection circuit module to measure the temperature of the plurality of battery cells,
 wherein each of the plurality of conductive lead plates comprises a plurality of levels that are arranged in substantially parallel planes interconnected by an interconnecting level that extends between the substantially parallel planes and wherein each of the plurality of lead plates has a hole formed in the interconnecting level into which the temperature sensor is inserted, for fixing the position of the temperature sensor,
 wherein the lead plate comprises a plurality of conductive plates electrically connecting two of the plurality of battery cells that are positioned side-by-side and an insulation film enclosing and connecting the plurality of conductive plates and
 wherein each of the plurality of conductive plates comprises a welding portion exposed from the insulation film so as to be electrically connected with an electrode terminal of one of the plurality of battery cells, the welding portion including one pair of welding terminals spaced apart from each other, and
 wherein each of the plurality of conductive plate comprises a bypass portion which bypasses the one pair of welding terminals and electrically connects the one pair of welding terminals.

2. The battery pack of claim 1, wherein the temperature sensor is connected with the protection circuit module via a flexible cable.

3. The battery pack of claim 1, wherein the bypass portion comprises one end contacting one of the one pair of welding terminals, and the other end contacting the other of the one pair of welding terminals, and
 an interval between the one end and the other end is larger than that between the one pair of welding terminals.

4. The battery pack of claim 1, wherein the bypass portion is folded on the one pair of welding terminals.

5. The battery pack of claim 1, further comprising a lead tab between the electrode terminal and the welding portion.

6. The battery pack of claim 5, wherein the lead tab comprises a temperature protection device.

7. The battery pack of claim 1, wherein the lead plate is positioned on the same side surfaces of the plurality of battery cells.

8. A battery pack comprising:
 a plurality of battery cells arranged side-by-side;
 a lead plate electrically connecting the plurality of battery cells;
 a protection circuit module electrically connected with the lead plate; and
 a temperature sensor electrically connected to the protection circuit module,
 wherein the lead plate comprises a plurality of levels that are arranged in substantially parallel planes interconnected by an interconnecting level that extends between the substantially parallel planes and wherein the lead plate has a hole formed in the interconnecting level exposing a surface of at least one of the plurality of battery cells, and
 the temperature sensor contacts the surface exposed through the hole to measure the temperature of the plurality of battery cells,
 wherein the lead plate comprises a plurality of conductive plates electrically connecting two of the plurality of battery cells that are positioned side-by-side and an insulation film enclosing and connecting the plurality of conductive plates, and
 wherein each of the plurality of conductive plates comprises a welding portion exposed from the insulation film so as to be electrically connected with an electrode terminal of one of the plurality of battery cells, the welding portion including one pair of welding terminals spaced apart from each other, and
 wherein each of the plurality of conductive plate comprises a bypass portion which bypasses the one pair of welding terminals and electrically connects the one pair of welding terminals.

9. The battery pack of claim 8, wherein the lead plate is positioned on the same side surfaces of the plurality of battery cells.

10. The battery pack of claim 8, wherein the temperature sensor is inserted into the hole.

11. The battery pack of claim 10, wherein the hole is formed in an area having a step.

12. The battery pack of claim 8, wherein the bypass portion comprises one end contacting one of the one pair of welding terminals, and the other end contacting the other of the one pair of welding terminals, and an interval between the one end and the other end is larger than that between the one pair of welding terminals.

13. The battery pack of claim 8, wherein the bypass portion is folded on the one pair of welding terminals.

14. The battery pack of claim 8, further comprising a lead tab between the electrode terminal and the welding portion.

15. The battery pack of claim 14, wherein the lead tab comprises a temperature protection device, and the electrode terminal is a negative electrode terminal.

16. The battery pack of claim 8, wherein the protection circuit module controls charge or discharge of the plurality of battery cells according to the temperature measured by the temperature sensor.

* * * * *